(12) United States Patent
O'Brien

(10) Patent No.: US 11,134,039 B1
(45) Date of Patent: Sep. 28, 2021

(54) DYNAMICALLY CONTROLLING MESSAGING PLATFORM CLIENT-SIDE AND SERVER-SIDE BEHAVIOR

(71) Applicant: Twitter, Inc., San Francisco, CA (US)

(72) Inventor: Nolan Daniel O'Brien, Henderson, NV (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/657,932

(22) Filed: Oct. 18, 2019

(51) Int. Cl.
*H04L 12/58* (2006.01)
*G06N 20/00* (2019.01)

(52) U.S. Cl.
CPC ........... *H04L 51/046* (2013.01); *G06N 20/00* (2019.01)

(58) Field of Classification Search
CPC .............................. H04L 51/046; G06N 20/00
See application file for complete search history.

(56) References Cited

U.S. PATENT DOCUMENTS

| | | | | |
|---|---|---|---|---|
| 9,632,765 B1* | 4/2017 | Falcone | ................... | G06F 21/33 |
| 2003/0023743 A1* | 1/2003 | Raphel | ................... | H04L 47/263 |
| | | | | 709/232 |
| 2009/0254465 A1* | 10/2009 | Oester | ..................... | G06F 21/77 |
| | | | | 705/34 |
| 2012/0158947 A1* | 6/2012 | Hassan | ................. | H04M 15/81 |
| | | | | 709/224 |
| 2012/0266201 A1* | 10/2012 | Kanojia | ............. | H04N 21/2187 |
| | | | | 725/109 |
| 2013/0304676 A1* | 11/2013 | Gupta | .................... | G06N 20/00 |
| | | | | 706/12 |
| 2014/0173051 A1 | 6/2014 | Sagayaraj et al. | | |
| 2015/0178370 A1* | 6/2015 | Shabtai | ............... | H04L 67/2847 |
| | | | | 707/748 |
| 2015/0281299 A1* | 10/2015 | Moustafa | ............ | H04L 65/4084 |
| | | | | 709/219 |
| 2016/0150450 A1* | 5/2016 | Balasubramanian | ........................ | |
| | | | | H04W 36/14 |
| | | | | 370/331 |
| 2016/0294603 A1* | 10/2016 | Whitner | ................ | H04L 43/024 |
| 2017/0017562 A1* | 1/2017 | Gulkis | ................ | G06F 11/3612 |
| 2017/0041355 A1 | 2/2017 | Ramamurthy et al. | | |
| 2018/0192142 A1 | 7/2018 | Paul | | |
| 2018/0255367 A1* | 9/2018 | Ren | .................... | H04N 21/4854 |
| 2019/0208270 A1 | 7/2019 | Bates et al. | | |

* cited by examiner

*Primary Examiner* — Philip C Lee
(74) *Attorney, Agent, or Firm* — Fish & Richardson P.C.

(57) ABSTRACT

Methods, systems, and apparatus, including computer programs encoded on computer storage media, for performing dynamic control of social messaging platform client-side and server-side behavior according to current and historical environmental, service, and application conditions.

22 Claims, 4 Drawing Sheets

DYNAMICALLY CONTROLLING MESSAGING PLATFORM CLIENT-SIDE AND SERVER-SIDE BEHAVIOR

BACKGROUND

This specification relates to social messaging platforms, and in particular, to dynamic control of social messaging platform client-side and server-side behavior according to current environmental, service, and application conditions.

Social messaging platforms and network-connected personal computing devices allow users to create and share content across multiple devices in real-time.

Sophisticated mobile computing devices such as smartphones and tablets make it easy and convenient for people, companies, and other entities to use social networking messaging platforms and applications. Popular social messaging platforms generally provide functionality for users to draft and post messages, including video content, both synchronously and asynchronously, to other users. Other common features include the ability to post messages that are visible to one or more identified other users of the platform, or even publicly to any user of the platform without specific designation by the authoring user. Examples of popular social messaging platforms include Facebook, Instagram, Pinterest, and Twitter. ("Facebook" and "Instagram" are trademarks of Facebook, Inc. "Pinterest" is a trademark of Pinterest, Inc. "Twitter" is a trademark of Twitter, Inc.)

SUMMARY

This specification describes technologies for improving user experience with an application by using signals from a user's device and application environment to dynamically change, for example, application features and content for the user based on the reliability, speed, and data cost of a user's network, and other features of the user's device and environment. The application may run in multiple different instances in a user device; and each application instance requests data for services, including content, from an application server, which is generally implemented on computers in one or more data centers remote from the user device. User devices are generally smartphones, electronic tablets, or personal computers.

More particularly, this specification describes technologies for customizing application behavior and the selection of content delivered to an application on a user device to improve performance of the application in terms of latency, i.e., time from when a request is made to when a response appears on the user device, application responsiveness, data usage, data security, content relevance, consumption of user device local storage, and other aspects of user experience.

The technologies use signals from a user's environment to customize application behavior and content to improve the user's experience with the application. An example of a change is increasing or decreasing the media richness of a message stream as network quality changes.

The technologies in some cases use machine learning to tune application parameters or determine when and how to toggle features. The parameters can affect, for example, one or more of application behavior, delivered content, default settings, or availability of application features. A change in feature availability can result in a change in an application user interface. The technologies collect various signals to feed the machine learning models. Some of these signals change infrequently, e.g., device class and operating system version; while other signals change frequently, e.g., battery level, available memory, network throughput, and network reliability; and others can be obtained from multiple devices, as opposed to coming from a single user device, e.g., data cost and routing trends.

The subject matter described in this specification can be implemented in particular embodiments so as to realize one or more of the following advantages. Client and server behavior and client configuration can be adapted quickly to changes in computing environment. Changes to the computing environment are captured quickly in a context. The context, which when considering the signals represented in the context, may also be referred to as the context status. The context is made available to client and server quickly and encapsulates all signals, raw or processed, that can affect behavior and configuration. The technologies for capturing, sharing, and using contexts are advantageously implemented in a scalable framework that can accommodate new context signals and new outputs. The outputs can include instructions that change client behavior and configuration, e.g., use of resources or availability of features, and outputs that control the availability and configuration of server-side operations, e.g., bandwidth of streamed content. The technologies can deal with both static context signals and dynamic context signals, e.g., signals that change when the client device moves. The technologies can reduce latency and cost, and data cost in particular, for the user of the application. The technologies provide a strong architecture for rapid iteration, and offers an ability to scale globally and across platforms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
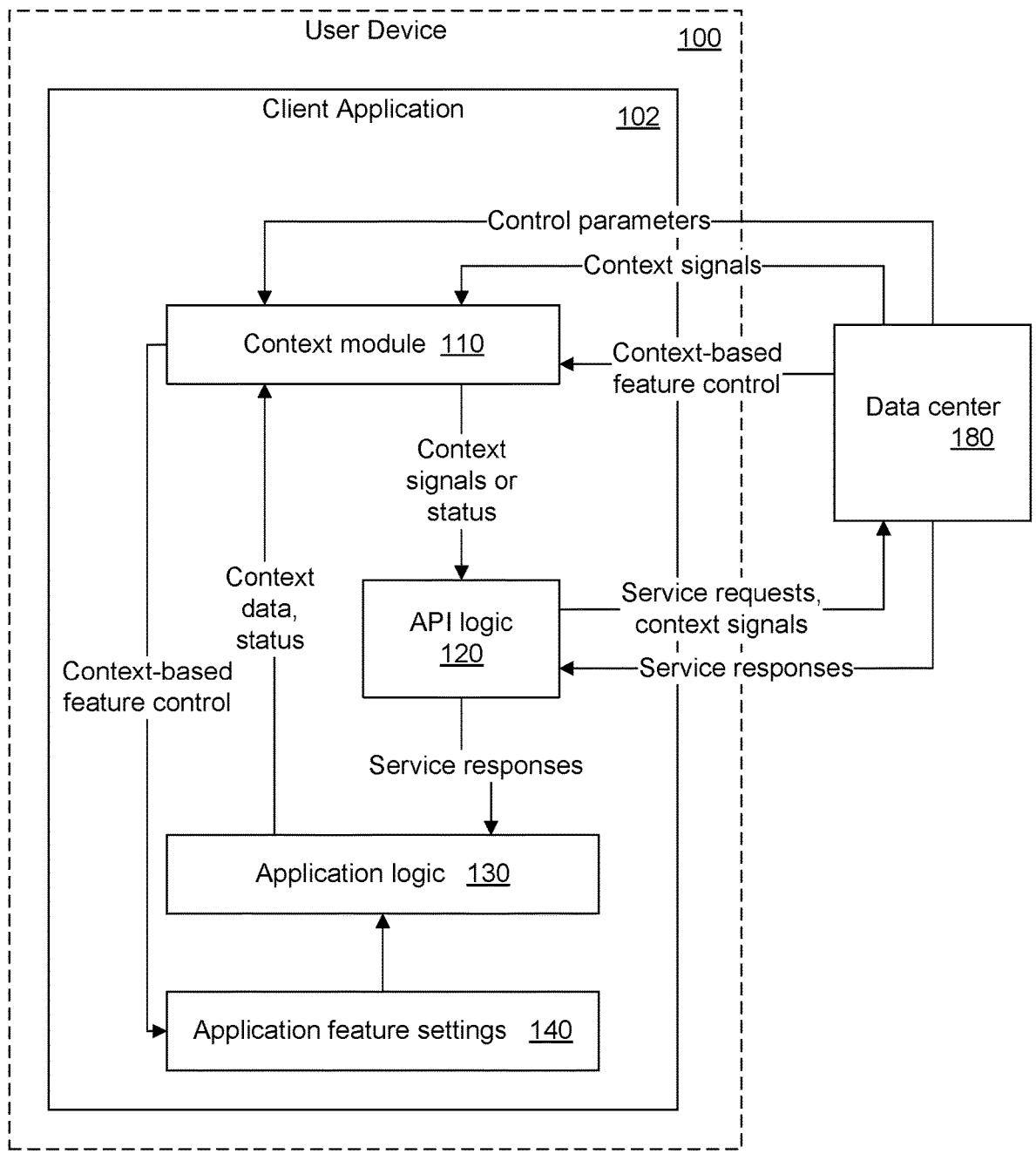
FIG. 1 is a diagram of an example client-side application instance as deployed on a user device and in communication with application servers and other software implemented in a data center.

FIG. 1 is a diagram of an example client-side application instance 102, which may be referred to as the application, when the meaning is clear, as deployed on a user device 100 and in communication with application servers and other software implemented in a data center 180. The data center contains one or more computers on which the application servers and other software are implemented and may be one of multiple data centers providing services to the application.

The application includes API (application programming interface) logic 120 that is configured to communicate with the APIs of application servers and other software of the data center. The application also includes application logic 130 that is configured to perform services for, and interact with, the user of the application, e.g., social messaging services in conjunction with data center application servers implementing a social messaging platform. The application logic, including user interfaces controlled by the application logic, operate according to application feature settings 140. In some implementations, the application feature settings are initially set according to values in an application manifest that is included with the application when it is deployed to the user device.

The application includes a context module 110. In some implementations, the context module is implemented and deployed as a separate component that runs in parallel with the application and interacts with application components through an application API implemented for that purpose.

The context module receives context data and status from the application logic and, generally, from other components, e.g., the operating system of the user device. The context module provides context signals, context status, or both, to the API logic.

This data, along with service requests, including requests for content, from the application logic, are provided by the API logic to servers in a data center. The API logic receives service responses, including content, from application servers in the data center and provides them to the application logic. The context module receives control parameters and, generally, context signals from the data center, which means, from servers or other modules running on a data center. The control parameters control various aspects of the operation of the context module, particularly with respect to context-based feature control operations, by which the context module may modify application feature settings.

In some implementations, a context module implemented as a server-side component may also provide context-based feature control from the data center to context module on the user device, to control application feature settings on the user device.

The signals and data from the data center to the context module may be communicated directly to the context module, as illustrated in FIG. 1, or they may be communicated through the API logic.

All the operations and signals mentioned above are described in more detail below.

Figure 2:
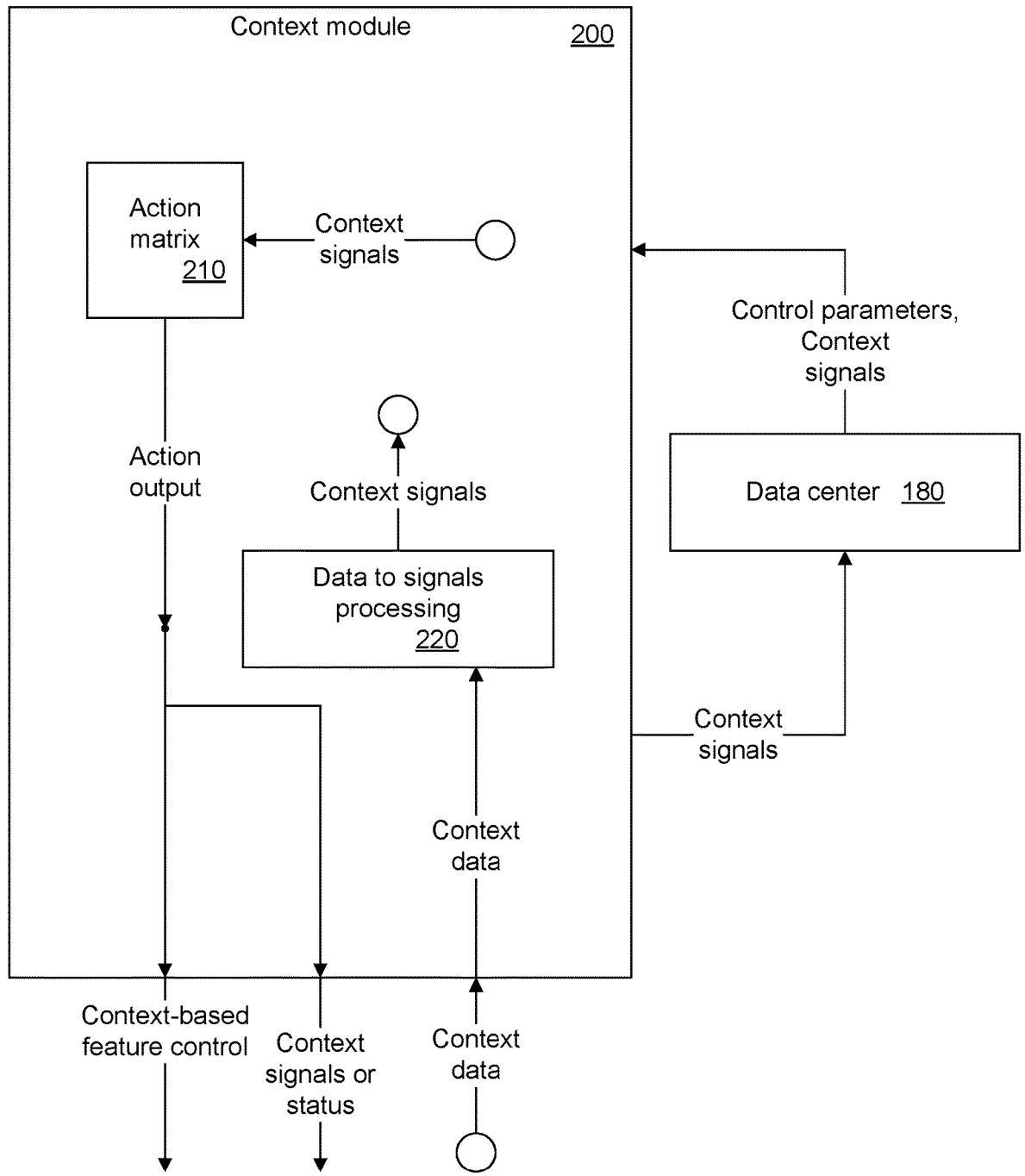
FIG. 2 is a block diagram illustrating components of an example context module.

FIG. 2 is a block diagram illustrating components of an example context module 200. The context module includes an action matrix module 210, a component that receives context signals as input and generates as output actions that are output by the context module as context-based feature control operations or context signals or status. The context module also includes a data to signals processing module 220, which receives context data as an input and generates context data as an output. Such generated context signals may be provided, as are other context signals from other sources, to the action matrix module. The signals and operations will be described in further detail below.

Figure 3:
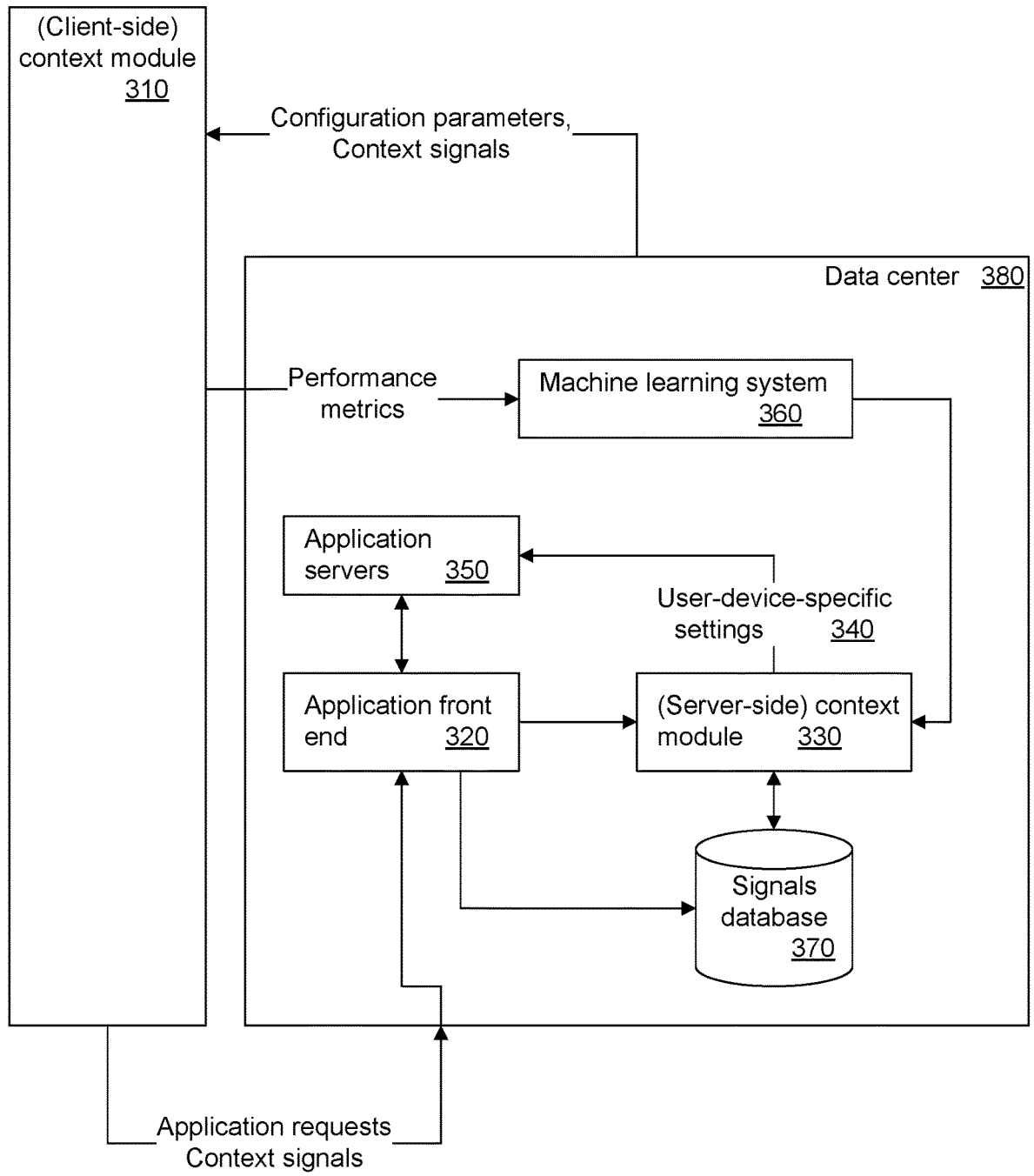
FIG. 3 is a block diagram illustrating servers and other software-based components implemented in one or more data centers to support the application and a client-side context module.

FIG. 3 is a block diagram illustrating servers and other software-based components implemented in one or more data centers 380 to support the application and a client-side context module 310. FIG. 3 also illustrates a server-side context module 330. If not specified or otherwise clear, the term "context module" will refer to a client-side module, i.e., one running in or with the application on a user device.

The servers in the data center include an application front end 320, which receives requests from the application, the application servers 350 that generate that responses to application requests and returns those responses through the front end, and the server side context module, which generates feature settings 340 specific for a user device, and the application or applications running the user device, and provides them to the application servers to control features implemented by the application servers, and provides such settings as well in the form of parameters and context signals to the client-side context module.

In some implementations, the data center also includes a machine learning system 360. The machine learning system receives performance metrics from the client-side context module and, optionally, from the server-side context module. The performance metrics are used as labels for the context signals and application feature settings, which labels denote how well the configuration of settings is working to generate good performance in the contexts defined by the context signals. This labeled data is used continuously or episodically to train one or more models that determine control parameters for context modules deployed with applications on user devices and, if any, in data centers. The machine learning system runs the model or models in production to generate the control parameters.

The context signals received from user devices and elsewhere can be collected in a signals database 370 for use by the machine learning system and other components. The database can be any collection of data: the data does not need to be structured in any particular way, or structured at all, and it can be stored on storage devices in one or more locations. In some implementations, the database is one or more datasets in an HDFS (Hadoop Distributed File System) data storage system. The signals can be augmented with time stamps and data representing device and application configuration status. The context signals and other data can be provided to the machine learning system for training and in production in either raw or normalize form, and optionally aggregated in either case.

As noted above, the principal purpose of collecting and using context signals to perform context-based actions is to improve the user's experience with the application, and, in concrete terms, to improve performance of the application in terms of measurable performance metrics, for example, latency, responsiveness, data usage, data transmission cost, content relevance, consumption of user device resources, e.g., processor and local storage resource and battery life, and other aspects of user experience. The performance metrics provided to the machine learning system can include these as well as other metrics.

Other data that is provided to the machine learning system in some implementations are signals that indicate actions taken by a user that indicate satisfaction or dissatisfaction with the performance of the application or the user device. Such actions can include, for example, changing feature settings that had been set by the context module.

Other indications of user satisfaction with performance of the application that can be provided to the machine learning system include: a measure of user engaging with content and with the application; measures of changes in the user's number of conversations, liking, sharing, opening of media and links, and overall viewing of content; and measures of application usage, e.g., usage going up with time and an increased frequency in using the application.

Figure 4:
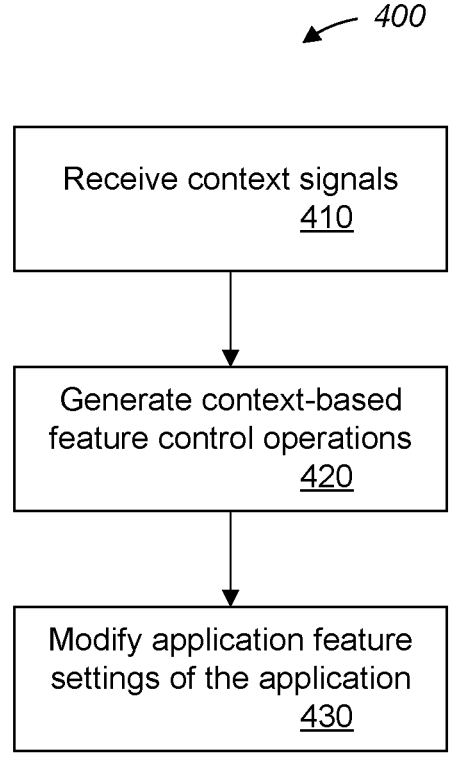
FIG. 4 is a flowchart of an example process for updating application feature settings of an application in response to a context status of the application running on a user device.

FIG. 4 is a flowchart of an example process 400 for updating application feature settings of an application in response to a context status of the application running on a user device. For convenience, the process will be described as being performed by a context module on the user device.

The context module receives context signals (410). The context signals represent operational conditions of the application and the user device. The context module generates context-based feature control operations (420) to modify feature settings of the application, according to the context signals received by the context module. Finally, the context module modifies application feature settings of the application (430) according to the context-based feature control operations.

Terms used in this specification and aspects of the technology described above will now be described in more detail.

Context Data and Context Signals

Context data can be generated or measured by application logic of an application running on a user device, by data center servers providing services for the application running on the user device, or both. Context signals can be raw context data or they can be context data that has been aggregated, averaged over time, or processed in some other way, to generate context signals.

A context signal is, in general, a signal that represents an aspect of a current operational state of the application, of the user device, of the data communications network, or of the application servers supporting the application. In some cases, the current state is a current value of a historical average or of a trend.

Context Data—Static User Device and Application Characteristics

Context data can include data that specifies one or more of the following static aspects of the user device: a screen size; a screen resolution; a device type, e.g., smartphone, electronic tablet, or personal computer; a screen resolution and size; a device class, e.g., a year of the device; or device specifications, e.g., processor type and speed, size of random access memory, amount of on-device non-volatile storage, which cell phone communication standards, if any, the device supports, e.g., LTE or 5G, or which Wi-Fi standards, if any, the user device supports, e.g., 802.11 b/g/n.

Context data can include data that specifies one or more of the following, generally static, aspects of the software on the user device: the operating system and operating system version; the application version; or the language used on the user device.

Context Data—Dynamic User Device Characteristics

Context data can include data that specifies one or more of the following dynamic, i.e., changeable, aspects of the user device: a network radio currently in use by the device, e.g., LTE, Wi-Fi, unknown, or offline; or a country in which the device is operating.

Context data can include data that specifies one or more of the following volatile aspects of the user device: an estimated remaining battery life; an estimated battery level; whether the battery is charging or not; a current CPU load of other applications running on the device; and a current network load of other applications running on the device.

Context data can include data that specifies one or more of the following aspects of data communication on the user device: the mobile phone network to which the device is connected, if any, and the connection speed; the Wi-Fi network to which the device is connected, if any, and the connection speed; any cellular network data plan parameters, e.g., amount of cellular data used in current cycle or amount of cellular data that can still be used before overage fees apply; an estimate of the current data transmission rate to upload to, and to download from, data center servers used by the application; a historical cellular data transmission rate over a predetermined time window, e.g., five or ten minutes, one or two days, a week, or a month; network speed as seen by the device; network time or data costs charged by the network or networks available to the device; an amount of cellular data used in a current session; or a current estimate or count of when or how many connections to the application's data center servers have been dropped, in a specified time window or in a current session.

As to data transmission rates, context data can include one or more of the following items: an estimated current round-trip time to the application server from the application API (application program interface); an estimated current round-trip time to a CDN (content distribution network) used by the application; or an estimated current DNS (domain name service) resolution time from an application API.

As to data transmission success, context data can include one or more of the following optional items: a number of requests from the application in a current session; a number of successful requests in the current session, based on network success, i.e., the application received a response of any kind; a number of failed requests, where the application received no response of any kind; or a number of currently pending requests.

Context data can also include data that specifies one of more of the following features of any cellular connectivity of the user device: the name of the mobile carrier; the Mobile Country Code (MCC) used by the carrier; the Mobile Network Code (MNC) used by the carrier; or the ISO 3166-1 country code, or the like, of the country where the user device is.

Context Data—Application-Specific Data

Context data can include data that specifies one or more of the following items of information relating to the application: a version of the application; a session identifier for the application, which is unique to the application running and changes on every cold start of the application; a session time, i.e., how long since the current session started; a request count, i.e., a count of how many requests to the application servers supporting the application have been started by the application, and a count of how many are outstanding; an estimated current round-trip time for a ping by the application to an application server; a number of accounts open in the application on the user device; or an amount of non-volatile storage space on the device used by the application.

Context Data—User-Set Feature Settings

Context data can include data that specifies one or more of the following user-set values of system settings, and whether such values have been explicitly set by the user: a value for a data saver control for cellular data; a value controlling autoplay, e.g., always autoplay video content, never do so, or do so only if content is received over Wi-Fi; a value indicating the user is sensitive to the cost of the transmission of large amounts of data to or from the application; a value that indicates how much data the user considers to be a problematic large amount of data; a value for a battery saver control; a value controlling whether to cap transmission rate for receiving or sending video, e.g., always, only while on a cellular network, or never; a value controlling whether the platform will send "media forward" streams, which are streams in which images or video clips are included within the stream to the application; a value to control whether images and video clips are included in a data feed by the application servers, e.g., true or false, or always, only when transmission to user device is over Wi-Fi, or never. A cellular data saver control value can be set to reduce the amount of data transmitted to or by the application, e.g., by reducing the size of images, the quality of video, or the quality of music. A battery saver control can be set to reduce device performance to increase battery life on the device.

Context Data—Events

In some implementations, the occurrence of particular events can be captured and recorded as user data. For example, any change by a user of a user-set value that can be changed by a context-based action can be recorded and handled as context data. Such events are useful as providing feedback to a machine learning system as signals that the actions of the context module are unsatisfactory for the user, when the event is a user-made change to a value that had been set by the context module.

Context Data—Generated by Servers

Context data and signals generated by data center servers can include data representing events or statistics on all aspects of the interactions between the application instances and user devices, on the one hand, and application servers, on the other. Examples of such data include aggregations and summaries of signals from multiple user devices, grouped by device and network characteristics.

Providing Context Data by Application Instances to Application Servers

A snapshot of context signal values is incorporated in API requests from the application to the application servers. In some implementations, such data is incorporated as part of every request to the application servers. In other implementations, a minimum time must pass from the last request that included particular context signals before such signals are incorporated in a subsequent request. In some implementations, only specific predetermined requests carry context signals. And, in some implementations, the primary mechanism of delivering context signals from the application to the application servers is a specific API request that has the purpose of carrying context signals as payload. Even so, the ability to provide context signals as metadata in other API requests provides for increased functionality across diverse API requests.

Different data items are generally provided with different frequency according to their volatility and importance. In some implementations, this data is placed in a URL encoded string as the value for an HTTP header field. In other implementations, the data could be encoded as a JSON encoded string, encoded to a Base64 encoding, or serialized in a protocol buffer. Other forms of data serialization or data compression can also be used.

The context data is taken from the API requests by a data center front end for the application servers.

Dynamic Behavior Control

The context module of an application running on a user device, or the servers supporting the application, can modify or control a number of aspects of the operation of the application or the servers or both, based on context received by the application or the servers, respectively. The context received on a device or a server is an encapsulation of context signals relating to the application and the device it is running on, and the services of the application servers that are providing content to the application.

Actions Controlling Features to Save Data Costs

The context module implements dynamic behavioral control to control the operation of features, including disabling features, according to a current context.

The actions controlling the features of the application can include one or more of the following actions to reduce data cost: When providing media to the user device, providing smaller instances, in particular, lower resolution of images and videos. When ranking messages for presentation to the user, penalizing multimedia messages in the ranking. Reducing the frequency of, or disabling entirely, media-rich advertisements, or providing text-only versions, if available. Reducing the frequency of, or disabling entirely, polling of servers for one or more services. Increasing a cache size for application content. Reducing the frequency of, or disabling entirely, background networking and requests. Disabling live streaming of content to the application. Disabling live sharing of photos or videos. Enabling a cellular data saver feature. Turning autoplay of video or audio off. Turning media forward data stream formats on or off. Setting video playing to play audio only. Lowering video quality on downloading or playing. Disabling search for, or downloading of, high communication burden items, e.g., videos or GIF (Graphic Interchange Format) images. Reducing video or image quality of before uploading or downloading. Delaying uploading of full quality videos or images.

The actions can also include one of more other actions to reduce burdens placed on the user device and other applications running on the user device. Such actions include turning foreground animation off, reducing the number of threads running in the application, or reducing the amount of random access memory allocated by the application.

A consequence of an action can be that a functionality of an application becomes entirely disabled, in which case the context module may cause the corresponding user interface element to be removed from the application's user interface. To avoid having the user interface jump around in front of the user, the context module can queue that change to occur after a change to a different user interface view. In other cases, a change can be reflected simply by a graying out of the features that have become unavailable.

Another consequence of an action can be that a media-only stream, i.e., a stream that is characterized as carrying only items that are or include media, e.g., photos and videos, is disabled or removed.

Another consequence of an action can be that some kinds of content are removed from messages or streams. For example, hashflag glyphs can be removed from messages.

Another consequence of an action can be that user interface elements are added. For example, progress bars and spinners can be displayed during content loads over a slow connection, to show a user that the application is still working.

Another consequence of an action can be to disable features that that would work badly on a current configuration of application or user device. For example, if a device's screen is too small, the action can disable dockable videos.

When a context module performs actions that set a value to change application or server behavior, the context module first obtains and records in memory the existing value of the feature setting and its status, i.e. whether it is a default setting, a user-set setting, a context-module-set setting, i.e., a setting previously set by the context module, or no setting at all. When the context changes for a user device so that the conditions that caused a previously performed action no longer exist, the context module reverts the settings change by the action to their previous value and status, when that value is consistent with the current context.

In addition to controlling features, context signals can also be used to select content that is relevant to helping the user get the most out of the user's network conditions, or the most out of the user's device. For example, targeted ads for products or services to upgrade the user's network or device could be determined to be relevant to the user, based on the context signals. Similarly, content related to a new user device or other new hardware the user is using, e.g., messages relating to the new hardware, could be determined to be relevant to the user. Content determined to be relevant is given a boost when content is ranked for presentation to the user.

Action Matrix Module

The context module 110, whether running in a client or in a server, performs a number of services, including those of an action matrix module 210. The action matrix module receives as input context signals. The context signals can include signals received from outside the context module, or signals generated from context data by a data to signals processing module 220, which may be implemented within the context module, or both.

The action matrix module generates context-based feature control operations for the application on the client device or for services provided by an application server, as the case may be, based on context signals received by the action matrix module. The action matrix module can optionally also generate context signals or status information for use by other components of the application or an application server. In some implementations, the action matrix module is implemented around matrix data structures that map combinations of signals to actions. In some cases, the actions are directly output that is provided in response to the context signals. In other cases, the actions are invocations of modules that perform computations to log data, generate outputs, or perform other actions.

Video Autoplay Example

The following paragraphs describe in detail the operations of an implementation of a context module with respect to video autoplay settings in a client application running on a user device.

The possible video autoplay settings include ON, OFF, and WIFI-ONLY. ON indicates that video content displayed by the user application will automatically begin playing when a user scrolls over that video content, i.e., when the user scrolls to make an image representation of that video content visible on a screen of the user device. OFF indicates that the video content displayed by the user application will not begin playing unless the user takes an additional affirmative action. WIFI-ONLY indicates that video content will automatically begin playing when a user of the user application scrolls over that video content, but only if the user device is connected to the content over a wired or wireless local area network rather than only over a cellular network.

The context module obtains context signals representing one or more device characteristics from the user device. These can include a remaining battery level of the user device, whether the user device is currently charging, an amount of data currently remaining in the data plan of the user device, and whether the user device is connected to a wired or wireless local area network.

The context module also obtains context signals representing one or more measures of network connection quality. Measures of network connection quality indicate one or more of a speed or success rate of data transfer from a data center to the client application. For example, the context module can obtain a signal representing a download bit rate of the client application. The context module can determine a download bit rate, for example, by (i) sending a request for a test file to a host server, (ii) receiving a response from the host server containing the test file, and (iii) dividing the size of the test file by a download time for the test file. The context module can also retrieve a historical download bit rate of the client application from application memory. The historical download bit rate can be an average of download bit rates of the client application over a predetermined number of previous application sessions, or a weighted average of such bit rates, e.g., weighted to emphasize more recent sessions, e.g., by exponential decay. Other measures of network connection quality include a total data usage of the client application during a current application session, a request success rate of the client application during the current application session, and a historical request success rate of the client application.

The context module also obtains a signal indicating whether the user has manually selected an autoplay setting, and if so, which one.

Based on the device characteristics and the measures of network connection quality, the context module calculates an autoplay score. The autoplay score indicates how acceptable the burden of autoplaying video content is, in view of the device characteristics and network connection quality. Based at least in part on the calculated autoplay score, the context module automatically selects one of the video autoplay settings. In some implementations, if the user has manually selected an autoplay setting, the context module will only override that setting, and then only to change it to a more restrictive setting if there is one, if the autoplay score indicates that the current setting results in a high cost or performance burden for the user or user device. In some implementations, the context module also or in the alternative uses particular values of data rate or battery level as thresholds below which the autoplay setting will be set to OFF.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

In addition to the embodiments of the attached claims and the embodiments described above, the following numbered embodiments are also innovative:

Embodiment 1 is a method comprising:
  receiving, by a context module deployed on a user device, context signals representing aspects of an operational state of the user device and an application running on the user device, wherein the context module is included in or operationally coupled to the application;
  generating, by the context module, context-based feature control operations to modify feature settings of the application, according to the context signals received by the context module; and
  modifying application feature settings of the application according to the context-based feature control operations.

Embodiment 2 is the method of embodiment 1, wherein the operational state also includes an operational state of one or more application servers and of a data communication network over which the application and the one or more application servers communicate with each other, wherein the operational state is specific to the application and user device.

Embodiment 3 is the method of any one of embodiments 1 to 2, wherein the context signals include signals indicating the following aspects of the state of the user device: a screen size and a screen resolution.

Embodiment 4 is the method of any one of embodiments 1 to 3, wherein the context signals include signals indicating one or more of the following aspects of the state of the user device: a size of random access memory or an amount of on-device non-volatile storage.

Embodiment 5 is the method of any one of embodiments 1 to 4, wherein the context signals include signals indicating the following aspect of the state of the application: an amount of non-volatile storage space on the user device used by the application.

Embodiment 6 is the method of any one of embodiments 1 to 5, wherein the context signals include signals indicating one or more of the following aspects of the state of the user device: which cell phone communication standards the user device supports or which Wi-Fi standards the user device supports.

Embodiment 7 is the method of any one of embodiments 1 to 6, wherein the context signals include signals indicating one or more of the following aspects of the state of the user device: an estimated remaining battery life, an estimated battery level, or whether the battery is charging or not.

Embodiment 8 is the method of any one of embodiments 1 to 7, wherein the context signals include signals indicating one or more of the following aspects of the state of the user device: a current CPU load of other applications running on the user device, or a current network load of other applications running on the user device.

Embodiment 9 is the method of any one of embodiments 1 to 8, wherein the context signals include signals indicating one or more of the following aspects of the state of the user device: a mobile phone network to which the device is connected, a connection speed of the mobile phone network, a Wi-Fi network to which the device is connected, or a connection speed of the Wi-Fi network.

Embodiment 10 is the method of any one of embodiments 1 to 9, wherein the context signals include signals indicating one or more of the following aspects of the state of the user device: cellular network data plan parameters of a cellular carrier to which the user device is connected, or network time or data costs charged by the network or networks available to the user device.

Embodiment 11 is the method of any one of embodiments 1 to 10, wherein the context signals include signals indicating one or more of the following aspects of the state of the user device: an estimate of a current data transmission rate to upload to, and to download from, data center servers used by the application, an estimated current round-trip time to the application server from an application API (application program interface) of the application, or an estimated current round-trip time to a CDN (content distribution network) used by the application.

Embodiment 12 is the method of any one of embodiments 1 to 11, wherein the context signals include signals indicating the following aspect of the state of the application: an estimated current round-trip time for a ping by the application to an application server.

Embodiment 13 is the method of any one of embodiments 1 to 12, wherein the context signals include signals indicating one or more of the following aspects of the state of the user device: a number of requests from the application to application servers in a current session, a number of successful requests to application servers in the current session, or a number of failed requests to application servers in the current session.

Embodiment 14 is the method of any one of embodiments 1 to 13, wherein the context signals include signals indicating one or more of the following aspects of the state of the application: a session time of how long since a current session started.

Embodiment 15 is the method of any one of embodiments 1 to 14, wherein the context signals include signals indicating the following aspect of the state of the application: a count of how many requests from the application to the application servers supporting the application are outstanding.

Embodiment 16 is the method of any one of embodiments 1 to 15, wherein the context signals include signals indicating one or more of the following aspects of the state of the user device: a name of the mobile carrier being used by the user device, a Mobile Country Code (MCC) used by the mobile carrier; a Mobile Network Code (MNC) used by the mobile carrier; or an ISO 3166-1 country code of the country where the user device is.

Embodiment 17 is the method of any one of embodiments 1 to 16, wherein the context signals include signals indicating the following aspect of the state of the application: a version of the application.

Embodiment 18 is the method of any one of embodiments 1 to 17, wherein the context signals include signals indicating the following aspect of the state of the application: a number of accounts currently open in the application on the user device.

Embodiment 19 is the method of any one of embodiments 1 to 18, wherein the context signals include signals indicating values of system settings and which values have been explicitly set by the user.

Embodiment 20 is the method of any one of embodiments 1 to 19, wherein the context-based feature control operations comprise: when ranking messages for presentation, penalizing multimedia messages in the ranking.

Embodiment 21 is the method of any one of embodiments 1 to 20, wherein the context-based feature control operations comprise: disabling search for, and downloading of, high communication burden items.

Embodiment 22 is the method of any one of embodiments 1 to 21, wherein the context-based feature control operations comprise: increasing a cache size for application content.

Embodiment 23 is the method of any one of embodiments 1 to 22, wherein the context-based feature control operations comprise: reducing a frequency of or disabling a polling of servers for one or more services.

Embodiment 24 is the method of any one of embodiments 1 to 23, wherein the context-based feature control operations comprise: reducing a frequency of or disabling media-rich advertisements entirely or providing text-only versions if available.

Embodiment 25 is the method of any one of embodiments 1 to 24, wherein the context-based feature control operations comprise: setting video playing to play audio only.

Embodiment 26 is the method of any one of embodiments 1 to 25, wherein the context-based feature control operations comprise: reducing a frequency of or disabling background networking and requests; disabling live streaming of content to the application; or disabling live sharing of photos or videos.

Embodiment 27 is the method of any one of embodiments 1 to 26, wherein the context-based feature control operations include operations to cause one or more of the following effects: turning foreground animation off, reducing the number of threads running in the application, or reducing the amount of random access memory allocated by the application.

Embodiment 28 is the method of any one of embodiments 1 to 27, wherein the context module is part of the application.

Embodiment 29 is a system comprising:
a user device having deployed on the user device an application and a context module, wherein the context module is included in or coupled to the application, wherein the context module is configured to perform operations comprising:
receiving context signals representing operational environmental conditions affecting the application and the user device, wherein the context module is included in or operationally coupled to the application; and
generating context-based feature control operations to modify feature settings of the application, according to the context signals received by the context module.

Embodiment 30 is the system of embodiment 29, wherein:
the system comprises multiple user devices having deployed on each of the multiple user devices the application and the context module.

Embodiment 31 is the system of embodiment 30, wherein the system and the user devices are configured to perform the methods of any one of embodiments 1 to 27.

Embodiment 32 is the system of any one of embodiments 29 to 31, wherein the context module is a client-side context module, the system further comprising:

one or more application servers configured to respond to requests from the application, the requests comprising requests for content; and a server-side context module configured to receive context signals relating to a particular user device and to provide server feature settings specific to the particular user device to the one or more application servers.

Embodiment 33 is the system of embodiment 32, wherein the server feature settings include settings to cause the one or more application servers to perform operations comprising: when ranking messages for presentation to the user, penalizing multimedia messages in the ranking Embodiment 34 is the system of any one of embodiments 32 to 33, wherein the server feature settings include settings to cause the one or more application servers to perform operations comprising: reducing a frequency of or disabling media-rich advertisements, or providing text-only versions, if available.

Embodiment 35 is the system of any one of embodiments 32 to 34, wherein the server feature settings include settings to cause the one or more application servers to perform operations comprising: disabling live streaming of content to the application.

Embodiment 36 is the system of any one of embodiments 32 to 35, wherein the server feature settings include settings to cause the one or more application servers to perform operations comprising: turning media forward data stream formats on or off Embodiment 37 is the system of any one of embodiments 32 to 36, wherein the server feature settings include settings to cause the one or more application servers to perform operations comprising: lowering video quality on downloading or playing.

Embodiment 38 is the system of any one of embodiments 32 to 37, wherein the server feature settings include settings to cause the one or more application servers to perform operations comprising: disabling search for, or downloading of, high communication burden items.

Embodiment 39 is the system of any one of embodiments 29 to 38, further comprising: a machine learning system configured:

(a) in training, to receive as training data multiple instances of contexts and corresponding performance metrics, each of the multiple instances representing context signals received by the system for an application running on a respective user device and a status of modifiable feature settings of the application, labeled with metrics representing performance qualities of the application or the user device, and to train a machine learning model to generate configuration parameters for the context module on the respective user device, whereby the machine learning model is trained to generate configuration parameters that correspond to better performance metrics; and (b) in production, to generate configuration parameters for the application on a particular user device by the machine learning model from inputs of context signals for the particular user device.

Embodiment 40 is the system of embodiment 39, wherein the metrics include metrics representing one or more of the following: latency, responsiveness, data usage, data transmission cost, content relevance, or consumption of user device resources.

Embodiment 41 is the system of any one of embodiments 39 to 40, wherein the metrics include metrics representing one or more of the following signals that representing actions taken by a user that indicate satisfaction or dissatisfaction with the performance of the application or the user device: a changing feature settings that had been set by the context module, opening of media and links, overall viewing of content, increases or decreases in application usage, or increases or decreases in frequency of application usage over time.

Embodiment 42 is the system of any one of embodiments 39 to 41, wherein the configuration parameters in production specify, for a current context of a particular user device, a corresponding set of application feature settings.

Embodiment 43 is the system of any one of embodiments 39 to 42, wherein: the machine learning system is in a data center remote from the user device.

Embodiment 44 is a computer storage medium encoded with a computer program instructions that are operable, when executed by data processing apparatus, to cause the data processing apparatus to perform the method of any one of claims 1 to 27.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, by a context module deployed on a user device, context signals representing aspects of an operational state of the user device and an application running on the user device, wherein the context module is included in or operationally coupled to the application, and wherein the context signals include signals indicating one or more of the following aspects of the state of the user device: a current CPU load of other applications running on the user device, or a current network load of other applications running on the user device;
generating, by the context module, context-based feature control operations to modify application feature settings of the running application according to the context signals received by the context module; and
modifying the application feature settings of the running application according to the context-based feature control operations.

2. The method of claim 1, wherein the operational state also includes an operational state of one or more application servers and of a data communication network over which the application and the one or more application servers communicate with each other, wherein the operational state is specific to the application and user device.

3. The method of claim 1, wherein the context signals include signals indicating the following aspect of the state of the application:
an amount of non-volatile storage space on the user device used by the application.

4. The method of claim 1, wherein the context signals include signals indicating one or more of the following aspects of the state of the user device:
an estimated remaining battery life, an estimated battery level, or whether the battery is charging or not.

5. The method of claim 1, wherein the context signals include signals indicating one or more of the following aspects of the state of the user device:
cellular network data plan parameters of a cellular carrier to which the user device is connected, or network time or data costs charged by the network or networks available to the user device.

6. The method of claim 1, wherein the context signals include signals indicating the following aspect of the state of the application:
a count of how many requests from the application to application servers supporting the application are outstanding.

7. The method of claim 1, wherein the context signals include signals indicating one or more of the following aspects of the state of the user device:
a name of a mobile carrier being used by the user device, a Mobile Country Code (MCC) used by the mobile carrier; a Mobile Network Code (MNC) used by the mobile carrier; or an ISO 3166-1 country code of the country where the user device is.

8. The method of claim 1, wherein the context signals include signals indicating values of system settings and which values have been explicitly set by the user.

9. The method of claim 1, wherein the context-based feature control operations comprise:
increasing a cache size for application content.

10. The method of claim 1, wherein the context-based feature control operations comprise:
reducing a frequency of or disabling a polling of servers for one or more services.

11. The method of claim 1, wherein the context-based feature control operations comprise:
setting video playing to play audio only.

12. The method of claim 1, wherein the context-based feature control operations comprise:
reducing a frequency of or disabling background networking and requests;
disabling live streaming of content to the application; or
disabling live sharing of photos or videos.

13. A system comprising:
a user device having deployed on the user device an application and a context module, wherein the context module is included in or coupled to the application, wherein the context module is configured to perform operations comprising:
receiving context signals representing operational environmental conditions affecting the application and the user device, wherein the context module is included in or operationally coupled to the application, and wherein the context signals include signals indicating one or more of the following aspects of the state of the user device: a current CPU load of other applications running on the user device, or a current network load of other applications running on the user device;
generating context-based feature control operations, according to the context signals received by the context module, to modify feature settings of the application while the application is running; and
performing the context-based feature control operations and modifying feature settings of the application while the application is running.

14. The system of claim 13, wherein the context module is a client-side context module, the system further comprising:
one or more application servers configured to respond to requests from the application, the requests comprising requests for content; and
a server-side context module configured to receive context signals relating to a particular user device and to provide server feature settings specific to the particular user device to the one or more application servers.

15. The system of claim 14, wherein the server feature settings include settings to cause the one or more application servers to perform operations comprising:
when ranking messages for presentation to the user, penalizing multimedia messages in the ranking.

16. The system of claim 14, wherein the server feature settings include settings to cause the one or more application servers to perform operations comprising:
reducing a frequency of or disabling media-rich advertisements, or providing text-only versions if available.

17. The system of claim 14, wherein the server feature settings include settings to cause the one or more application servers to perform operations comprising:
disabling live streaming of content to the application.

18. The system of claim 14, wherein the server feature settings include settings to cause the one or more application servers to perform operations comprising:
disabling search for high communication burden items.

19. The system of claim 13, further comprising:
a machine learning system configured:
(a) in training, to receive as training data multiple instances of contexts and corresponding performance metrics, each of the multiple instances representing context signals received by the system for an application running on a respective user device and a status of modifiable feature settings of the application, labeled with metrics representing performance qualities of the application or the user device, and to train a machine learning model to generate configuration parameters for the context module on the respective user device, whereby the machine learning model is trained to generate configuration parameters that correspond to better performance metrics; and (b) in production, to generate configuration parameters for the application on a particular user device by the machine learning model from inputs of context signals for the particular user device.

20. The system of claim 19, wherein the metrics include metrics representing one or more of the following:

latency, responsiveness, data usage, data transmission cost, content relevance, or consumption of user device resources.

21. The system of claim 19, wherein the metrics include metrics representing one or more of the following signals representing actions taken by a user that indicate satisfaction or dissatisfaction with the performance of the application or the user device:

a change in feature settings that had been set by the context module, opening of media and links, overall viewing of content, increases or decreases in application usage, or increases or decreases in frequency of application usage over time.

22. The system of claim 19, wherein the configuration parameters in production specify, for a current context of a particular user device, a corresponding set of application feature settings.

* * * * *